May 15, 1962     T. B. GORDON     3,034,767

POWERED WARPING BLOCK FOR HAULING CRAB POTS AND THE LIKE

Filed Jan. 10, 1961     2 Sheets-Sheet 1

INVENTOR.
TULLUS B. GORDON

BY
Reynolds & Christensen
ATTORNEYS

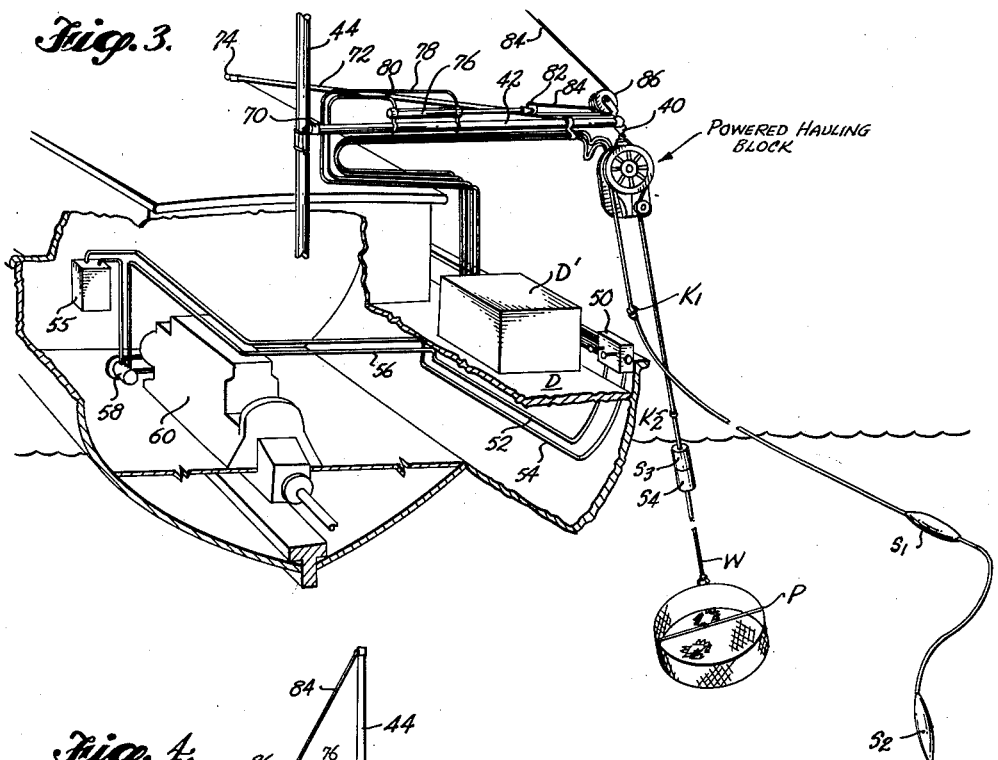
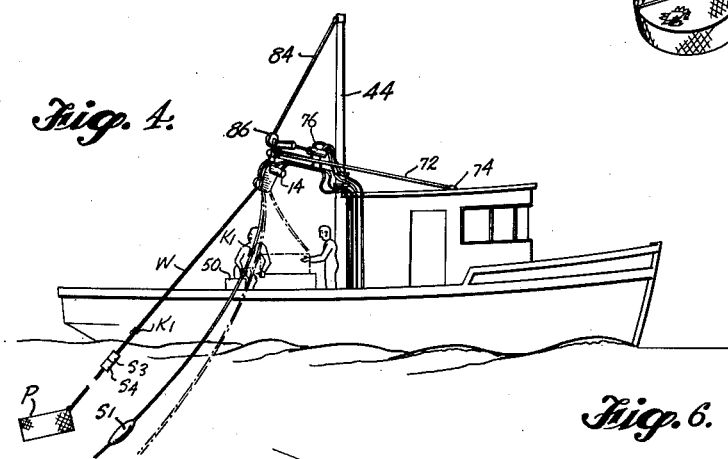
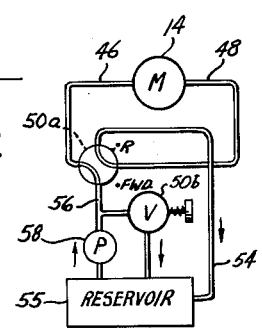
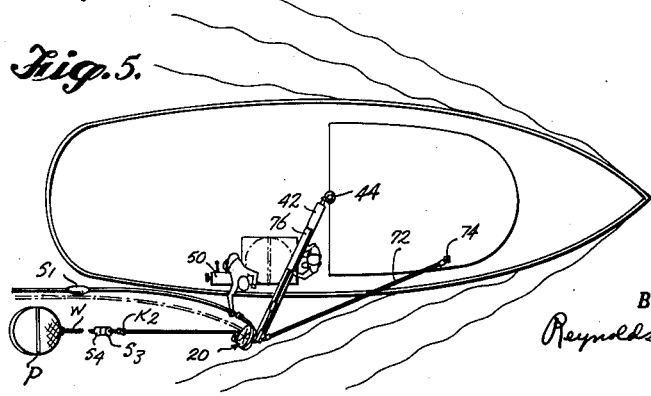

United States Patent Office 3,034,767
Patented May 15, 1962

3,034,767
POWERED WARPING BLOCK FOR HAULING
CRAB POTS AND THE LIKE
Tullus B. Gordon, Seattle, Wash., assignor to Marine Construction & Design Co., Seattle, Wash., a corporation of Washington
Filed Jan. 10, 1961, Ser. No. 81,743
14 Claims. (Cl. 254—139.1)

This invention relates to a new and improved apparatus and method for hauling crab pots, lobster pots and other or similar units in a marine environment. The invention is herein illustratively described by reference to the presently preferred embodiment thereof; however, it will be recognized that certain changes and modifications therein with respect to details may be made without departing from the underlying and essential features involved.

The invention will be described herein by reference to its preferred and primary application, namely, the hauling of crab pots or traps aboard a vessel for the purpose of unloading the pots, rebaiting and resetting the same. In the past this chore proved to be time consuming and laborious, especially when conducted in deep water and when the pots became sanded down (i.e., embedded) due to tidal action. In periods of stormy weather the pots might go untended for as much as three weeks or longer, in which case the loading and embedment factors made hauling extremely difficult. In many cases the pot warps broke during hauling under these conditions, with resultant loss of gear, even with the utmost care exercised by a skilled hand. With conventional winches or niggerheads used for hauling and with the vessel riding in a heavy swell, the danger of breaking the warp of a sandeddown pot was great, and the time consumed in dislodging it considerable.

With the present invention these and other difficulties are largely overcome with novel apparatus having the additional attributes of simplicity of construction and operation, reliability, durability, compactness and versatility.

The technique and apparatus provided by this invention enables crab pots to be hauled, unloaded, rebaited and reset in very short order and with relative ease. For example, in one typical trial run using the invention to haul a succession of pots in twenty-five fathoms of water the pots were easily hauled, dumped of their catch, rebaited and reset in an average of forty-five seconds each, allowing time for movement between pot stations and for grappling the pot warps at each station.

A further object is to accomplish these results without requiring any change in the crab pot gear itself and without requiring any substantial change in the fishing vessel, other than the simple installation of the apparatus of this invention, which may be produced at a cost which is small in comparison with the economic advantages gained from its use.

A specific object is to provide such a hauling system in which the hauled portion of the warp and its surface floats may be conveniently and automatically reset during and as a part of the hauling operation itself, thereby contributing materially to the saving of time and labor, and permitting extremely high hauling rates, since line management is largely eliminated as a problem.

In accordance with this invention as herein disclosed with application to crab fishing, a powered warping block is suspended closely beneath an elevated support located above and slightly outboard from the side of the vessel, and the block is free to swing and to swivel in relation to the support. The block is characterized by a main powered sheave mounted rotationally on one side of the block, with the sheave's general plane of rotation substantially aligned with the block hanger, and with its rotational axis offset from such hanger, such sheave having a relatively shallow and wide groove entrance portion and a relatively deep and narrow groove base portion with inwardly converging sides which permit wedging of the running bight of the warp down into the groove while excluding knots therefrom, which knots are, however, accommodated by the groove entrance portion. In addition, the block includes a line separator element preferably having two tips which enter the groove and are directed in opposite circumferential directions therein to separate or strip the line from the groove as the tightly compressed running bight advances continuously around the pulley in the hauling operation. A fair lead idler sheave is mounted freestanding on the same side of the block to rotate on an axis parallel to the axis of the main sheave, such that the load end of the bight leading to the main sheave is deflected by engagement with the idler sheave at a location offset from a plane substantially containing the hanger and the axis of the main sheave, thereby to facilitate selfaddressment of the block to the line so as to minimize any tendencies towards line entanglement, interference between ends or sections of the warp leading from the block, chafing and wear, and undue sheave loading caused by inefficiently directed forces.

These and other features, objects and advantages of the invention will become more fully evident from the following description thereof by reference to the accompanying drawings.

FIGURE 3 is a perspective view showing a fishing vessel from a rear aspect, and partly in section, in which the warping system is installed.

FIGURE 4 is a side elevation of a fishing vessel having the system, the view illustrating a stage in the hauling process.

FIGURE 5 is a plan view corresponding to FIGURE 4.

FIGURE 6 is a schematic diagram of a hydraulic system for operating the powered warping block in accordance with the invention.

Figure 1:
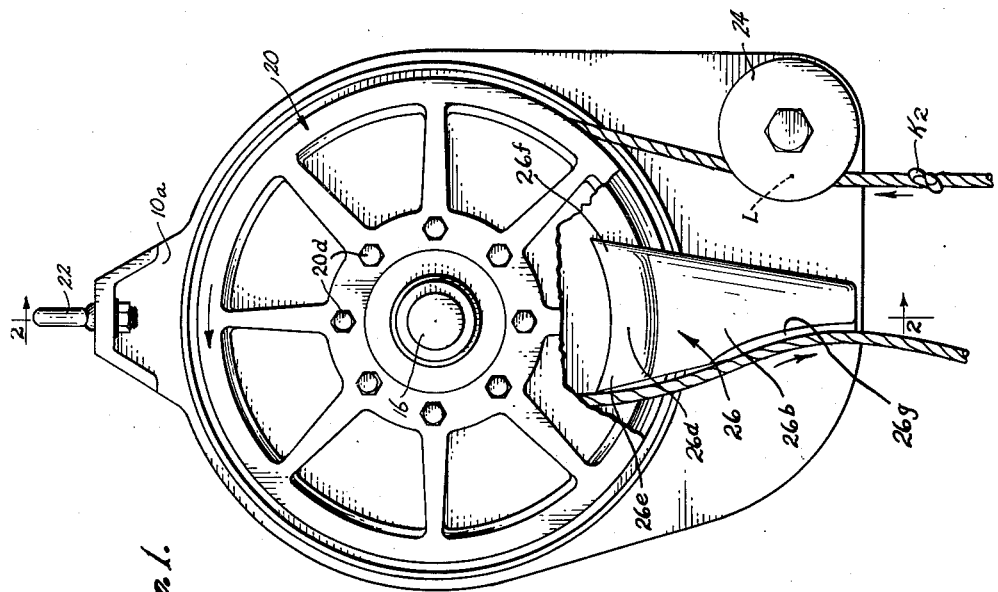
FIGURE 1 is a side view of the novel powered warping block designed for hauling crab pots and the like, with a portion of the main sheave broken away to show the line separator element.
Figure 2:
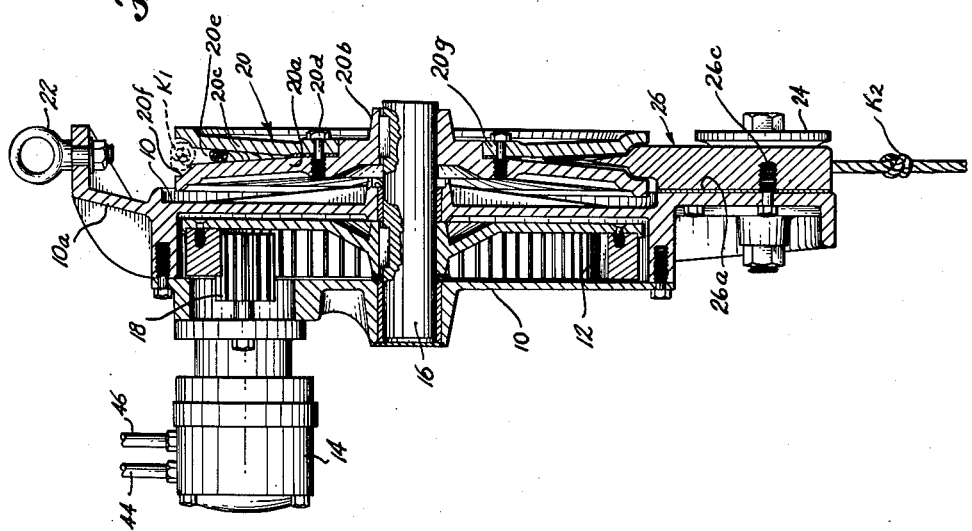
FIGURE 2 is a vertical sectional view taken on line 2—2 in FIGURE 1.

Referring to the drawings, the usual crab fishing gear with which the invention may be used includes the crab pot P, the pot line or warp W, two surface floats S1 and S2 with line between them for grappling purposes, and two submerged floats S3 and S4 which hold up and thus guard the lower end portion of the warp against chafing on the pot and on the bottom. The upper submerged float S3 normally bears upwardly against a large line knot K1 and has a slide aperture through it which is sufficiently large to pass readily over the lower line knot K2 when the pot is hauled. The lower submerged float S4 has an aperture through it which prevents it from rising on the line beyond the lower and smaller line knot K2. When the pot is hauled, both of the floats can usually slide all the way to the pot. When the line is hauled with the invention, the upper submerged float S3 backed against the float S4 which in turn is backed against the pot coupling, functions as a stop which bears against a lower element on the hauling block to limit the upward movement of the pot and adds radius or length to the effective arm on which the pot may be swung pendulously in order to draw it inboard over the side of the vessel and onto the working surface D' thereof which may comprise an elevated platform mounted on the deck D, as will appear.

The powered warping block as illustrated comprises a base 10 which in this instance serves as a casing for the internal ring gear 12, and as a mount for the hydraulic motor 14 which drives such ring gear through the pinion 18. The base also serves as a support for the shaft 16 which is keyed to the ring gear and which projects outwardly from one side of the base as a cantilever support for the open face pulley or sheave 20, also keyed to the shaft as shown.

The base also carries hanger means in the form, for example, of the eye bolt 22 which is fastened to the upper projection 10a on the base and which serves as a connecting device by which the block may be suspended from an elevated support in order to permit free swinging and free swiveling of the block relative to such a support (to be described).

On the same side of the base 10 as that from which the main sheave 20 projects there is also mounted a fair lead idler sheave 24 and a line separator element or stripper 26, both to be described hereinafter.

The main sheave 20 is formed in two halves. The inner half or side plate 20a comprises the main portion of the sheave which incorporates the hub 20b keyed to the drive shaft 16. The other half or plate 20c is secured by machine screws or bolts 20d to the main half. Together the sheave side plates form a groove which includes a deep and narrow base portion 20e having sides which converge inwardly at a small acute angle, and a relatively shallow and wide entrance portion 20f designed to accommodate the line knots K1 and K2, which are too large to enter the base portion 20e. The base portion 20e has an entrance width which is just large enough to permit the line or warp W to enter, whereupon it becomes wedged down tightly into the groove as a result of the load forces acting on the line and the drive force applied by the sheave in hauling the line, such wedging action serving to increase the attainable friction force in order to haul the line without appreciable slippage and despite heavy loads exerted thereon. Since the warps used in commercial crab fishing and in similar fields vary in diameter, the entrance width of the groove base portion 20e is subject to variation by changing the thickness of the annular shim 20g which is interposed between the two plates of the sheave 20 in order to establish a desired spacing between them. When this shim is changed as to thickness, so is the thickness of the shim 26a interposed between the line separator element 26 and the adjacent face of the base 10, so as to maintain the centered relationship of the separator element in the sheave groove.

The line separator element 26 comprises a shank portion 26b which is secured by machine bolts or screws 26c to the face of the base 10 at a relative location opposite that on the sheave which is adjacent to the suspension hanger 22, and preferably includes an upwardly projecting tapered portion 26d which projects upwardly into the sheave groove. This upwardly projecting portion preferably has two oppositely directed tips 26e and 26f, directed circumferentially of the groove and suitably rounded and shaped so that as the line or warp approaches the separator element from either direction (i.e., with the sheave rotating in one direction or the other), the line will be stripped from the sheave groove without chafing or wear despite its highly compressed condition in that groove as it travels around the running bight engaged in the sheave. To this end the separator element preferably is aligned with a plane containing the axis of the main sheave 20 and the suspension or hanger element 22 so that the two tips 26e and 26f bear the same relationship to the friction-bound line regardless of which of the tips acts on the line in either of the two directions of sheave rotation.

Preferably the separator element also comprises a sloping shoulder 26g, i.e., sloping in relation the plane of the adjacent side of the base 10 and designed to deflect and direct the outgoing portion of line from the bight as it leaves the sheave in the normal direction in which the sheave rotates, as shown by the arrows in the figure. As a result the line is more readily reached by a fisherman standing at the side of the vessel adjacent to the operating station and there is less chance of entanglement between the incoming and outgoing stretches of line passing around the sheave.

The idler sheave 24 comprises a fair lead for the sheave and as a result of which directs the line effectively into the groove of the main sheave while, because of the offset location of the idler sheave, provides a moment arm about the swivel axis of the block which causes the normal forces playing through the line on the block to address the block correctly in relation to the line so that the block acts efficiently and with minimum tendency to chafe the line. This fair lead idler sheave is mounted in free-standing position on the same side of the base 10 as that which accommodates the main sheave, and rotates in the same general plane as the main sheave. It rotates on an axis parallel to the axis of the main sheave such that the load end of the warp bight leading to the main sheave is deflected by and around the idler sheave at a location L offset from a plane substantially containing the axis of the main sheave and the hanger 22, whereby a moment arm is provided to facilitate self-addressment of the block to the line.

Referring now to the installation views, the powered hauling block is suspended by a coupling, such as a length of line or a swiveling universal connector 40 on the end, in this instance, of a laterally directed elevated boom 42 mounted on the mast 44. Flexible hydraulic lines 46 and 48 extend from the hydraulic motor 14 to the boom, thence to a control panel 50 mounted at the rail or at another convenient location at the operating station. From the control panel lines 52 and 54 extend to the sump or hydraulic fluid reservoir 55, one line (52) by way of the hydraulic pump 58 which is driven by the boat's engine 60 or other power source. As shown in FIGURE 6, the hydraulic motor 14 is preferably of the reversible type, and may be reversed by reversing the position of the control valve 50a located in the control panel 50. An adjustable relief valve 50b connected in a by-pass from the pump 58 to the reservoir 56 establishes a maximum, and adjustable, upper limit on the torque which may be applied to the drive sheave 20, in either direction of motor rotation.

The inner end of the boom is secured to the mast 14 by a universal coupling 70 which permits the boom to be swung fore and aft, which thereby permits the outer end of the boom to be adjusted in its position fore and aft by shortening or lengthening the adjustable rigid brace 72. The latter is pivotally connected at 74 to the cabin or other support, and permits the boom to be raised and lowered by means of the hydraulic jack 76 mounted on the boom. This jack is connected through hydraulic lines 78 and 80 to the pump lines through the control panel 50 which carries an appropriate control to operate the jack. The outer end of the jack rod carries a sheave 82 about which the line 84 passes, one end of the line being anchored to the end of the boom and the other end of the line passing around a sheave 86 on the end of the boom, thence upwardly to a tie point on the mast, so that as the jack is extended and contracted the boom is raised and lowered.

In operation, the pot warp is grappled between the surface floats S1 and S2 as the vessel approaches and, with the boom in lowered position, a bight is formed in the warp and laid over the main sheave 20 and deflected around the fair lead idler sheave 24 as depicted. The warp is then hauled by powered rotation of the main sheave in the normal direction shown by the arrow in FIGURE 1 in order to raise the pot and at the same time to continuously pay out the warp from the block. The vessel remains under way during this operation so that the drag of the water on the departing free end of the warp, including the floats S1 and S2, prevents it from stacking or accumulating in any manner which could cause entanglements and also exerts a certain amount of force on the block tending to turn it about its swivel axis and to swing it slightly aft. The force of water acting on the pot P and the incoming warp also causes a substantial drag which causes this end of the line to assume an angle sloping downwardly in an aft direction, which has its effect on the angular position assumed by the block. The block assumes an attitude, or addresses itself to the line, in accordance with these forces and in a manner which tends to minimize chafing and wear on the line and inefficient operation due to misalignments of forces. As the line is being hauled, the hydrauilc motor 76 is operated to raise the boom to a somewhat higher elevated position so that as the crab pot breaks the surface and brings the two slider floats S3 and S4 into abutment with the fair lead sheave 24, the heavy pot will be at a sufficiently elevated position, in its pendulously swinging state, to be grasped and swung inwardly at the proper instant to deposit it on the platform D'. The pendulous swinging of the pot on its effective radius arm, which includes the length of the two slider floats S3 and S4 (normally about sixteen inches) and the suspended length of the block between the swiveled pivotal connection 40 and the lower end of the block (a total of about two feet or more in a typical case), is sufficient to enable the pot to be swung conveniently inward without great effort in order to deposit it on the table D'.

The fact that the vessel is under way as the pot is being hauled means that it will break the surface at a point materially aft from a spot directly beneath the hauling block and that the pendulous swinging of the pot will automatically take place as a result thereof and of rolling of the vessel, which will culminate in the timed inward swinging effected by the skilled operator in order to deposit the heavy pot on the working platform D'.

As the loaded pot is deposited on the platform D' for purposes of unloading and rebaiting it will be appreciated that virtually the entire pot warp has already been payed out and lies along the water, partially submerged between the vessel and the surface floats S1 and S2, and that it is merely necessary to disengage the warp from the powered hauling block in order to reset the pot by dropping it overboard. In order conveniently to do this, the prime mover 14 is reversed by operating the valve 58. As it is reversed, the operator, grasping the outgoing free stretch of the warp displaces it slightly out of the plane of the drive sheave 20 so that as the sheave rotates and the length of bight gripped in its groove is dislodged by the line separator tip 26f, the line will be entirely freed fromt he sheave without additional line becoming wedged in the groove. Grasping of the free line stretch for this purpose is facilitated by the inclined shoulder 26g which throws the line laterally toward the operator and enables him to reach it conveniently just before the drive motor is reversed.

By appropriate adjustment of the relief valve 50b in the by-pass, should the pot be sanded down the maximum tension created in the line by the rotation of drive sheave 20 is limited, because the available pressure to operate the hydraulic motor 14 is limited in accordance with the setting of the relief valve. Thus, under these conditions, and they can readily be detected by the operator who watches the progress of the hauling operation, the vessel is stopped and the hydraulic motor keeps working to apply the maximum torque to the line. As the vessel rises and falls in the swells the line see-saws back and forth over the drive sheave, which can be reversed in direction if the load force in the line exceeds the torque applied by the drive motor, and vice versa, alternately, so as to permit the vessel to ride the swells without unduly increasing tension in the line. The continuing application of tension in the line by the drive motor causes the pot to be worked loose from the bottom and eventually to be hauled in as it is freed. By the same token, the motor is unable to break the line or to damage the surfaced floats S3 and S4 as they come into abutment with the lower side of the powered hauling block, when the relief valve 59b has the proper setting.

Thus, the gear is protected against breakage, and the pots may be hauled very rapidly, dumped, rebaited and reset in a minimum of time without the usual backbreaking laborious effort and the usual problems of line management.

These and other aspects of the invention will be apparent to those skilled in the art based on this disclosure of its presently preferred embodiment.

I claim as my invention:

1. A powered warping block for hauling crab pots and the like, comprising a base having hanger means thereon by which the suspsend the block from a elevated support for free swinging and swivelling of the block relative to the support, and a motor-driven sheave mounted rotationally on one side of said base, with its general plane of rotation substantially aligned with the hanger means and with its rotational axis offset from said hanger means, said main sheave standing free on said one side of the base to permit hanging a line bight over the sheave to run in its groove, and to permit removing the bight therefrom, by direct lateral approach and withdrawal of the bight in relation to the peripheral portion of the sheave adjacent the hanger means, the groove of said sheave having a deep base portion with sides converging inwardly at a small acute angle to permit wedging of the running bight tightly down into the groove for increasing the sheave's friction force attainable thereon, and a line separator element mounted on said base adjacent a peripheral location on the sheave generally opposite that adjacent the hanger means, said separator element being operable to deflect the free end of the running bight out of the groove as the sheave rotates.

2. A powered warping block for hauling crab pots and the like, comprising a base having hanger means thereon by which to suspend the block from an elevated support for free swinging and swiveling of the block relative to the support, and a motor-driven sheave mounted rotationally on one side of said base, with its general plane of rotation substantially aligned with the hanger means and with its rotational axis offset from said hanger means, said main sheave standing free on said one side of the base to permit hanging a line bight over the sheave to run in its groove, and to permit removing the bight therefrom, by direct lateral approach and withdrawal of the bight in relation to the peripheral portion of the sheave adjacent the hanger means, the groove of said sheave having a relatively wide and shallow entrance portion adapted to accommodate knots in the line, and a relatively deep and narrow base portion with sides converging inwardly at a small acute angle to permit wedging of the running bight tightly down into the groove, while excluding line knots therefrom, for increasing the sheave's friction force attainable on the line, and a line separator element mounted on said base adjacent a peripheral location on the sheave generally opposite that adjacent the hanger means, said separator element being operable to deflect the free end of the running bight out of the groove as the sheave rotates.

3. A powered warping block for hauling crab pots and the like, comprising a base having hanger means thereon by which to suspend the block from an elevated support for free swinging and swivelling of the block relative to the support, a main sheave mounted rotationally on one side of said base, with its general plane of rotation substantially aligned with the hanger means and with its rotational axis offset from said hanger means, drive means including a motor mounted on said base and connected to the main sheave to drive the same normally in one direction, said drive means including means adjustable to vary the maximum drive torque which may be applied to the main sheave in said direction, means permitting the sheave to be stopped and to be reversely rotated by an opposing load torque acting thereon exceeding said drive torque, and means operable to reverse the direction of drive torque applied to the main sheave, said main sheave standing free on said one side of the base to permit hanging a line bight over the sheave to run in its groove, and to permit removing the bight therefrom, by direct lateral approach and withdrawal of the bight in relation to the peripiheral portion of the sheave adjacent the hanger means, the groove of said sheave having a deep base portion with sides converging inwardly at a small acute angle to permit wedging of the running bight tightly down into the groove for increasing the sheave's friction force attainable thereon, and a line separator element mounted on said base adjacent a peripheral location on the sheave generally opposite that adjacent the hanger means, said separator element being operable to deflect the free end of the running bight out of the groove as the sheave rotates.

4. A powered warping block for hauling crab pots and the like, comprising a base having hanger means thereon by which to suspend the block from an elevated support for free swinging and swivelling of the block relative to the support, a main sheave mounted rotationally on one side of said base, with its general plane of rotation substantially aligned with the hanger means and with its rotational axis offset from said hanger means, drive means including a motor mounted on said base and connected to the main sheave to drive the same normally in one direction, said drive means including means adjustable to vary the maximum drive torque which may be applied to the main sheave in said direction, means permitting the sheave to be stopped and to be reversely rotated by an opposing load torque acting thereon exceeding said drive torque, and means operable to reverse the direction of drive torque applied to the main sheave, said main sheave standing free on said one side of the base to permit hanging a line bight over the sheave to run in its groove, and to permit removing the bight therefrom, by direct lateral approach and withdrawal of the bight in relation to the peripheral portion of the sheave adjacent the hanger means, the groove of said sheave having a deep base portion with sides converging inwardly at a small acute angle to permit wedging of the running bight tightly down into the groove for increasing the sheave's friction force attainable thereon, and a line separator element mounted on said base adjacent a peripheral location on the sheave generally opposite that adjacent the hanger means, said separator element being operable to deflect the free end of the running bight out of the groove as the sheave rotates, and a fair lead idler sheave mounted free standing on the same side of the base to rotate on an axis parallel to the axis of the main sheave, such that the load end of the bight leading to the main sheave is deflected by engagement with the idler sheave at a location offset from a plane substantially containing the hanger means and the axis of the main sheave, thereby to facilitate self-addressment of the block to the line.

5. A powered warping block for hauling crab pots and the like, comprising a base having hanger means thereon by which to suspend the block from an elevated support for free swinging and swivelling of the block relative to the support, and a motor-driven sheave mounted rotationally on one side of said base, with its general plane of rotation substantially aligned with the hanger means and with its rotational axis offset from said hanger means, said main sheave standing free on said one side of the base to permit hanging a line bight over the sheave to run in its groove, and to permit removing the bight therefrom, by direct lateral approach and withdrawal of the bight in relation to the peripheral portion of the sheave adjacent the hanger means, the groove of said sheave having a relatively wide and shallow entrance portion adapted to accommodate knots in the line, and a relatively deep and narrow base portion with sides converging inwardly at a small acute angle to permit wedging of tthe running bight tightly down into the groove while excluding line knots therefrom for increasing the sheave's friction force attainable on the line, and a line separator element mounted on said base adjacent a peripheral location on the sheave generally opposite that adjacent the hanger means, said separator element being operable to deflect the free end of the running bight out of the groove as the sheave rotates, and a fair lead idler sheave mounted free standing on the same side of the base to rotate on an axis parallel to the axis of the main sheave, such that the load end of the bight leading to the main sheave is deflected by engagement with the idler sheave at a location offset from a plane substantially containing the hanger means and the axis of the main sheave, thereby to facilitate self-addressment of the block to the line.

6. A powered warping block for hauling crab pots and the like, comprising a base having hanger means thereon by which to suspend the block from an elevated support for free swinging and swivelling of the block relative to the support, a main sheave mounted rotationally on one side of said base, with its general plane of rotation substantially aligned with the hanger means and with its rotational axis offset from said hanger means, drive means including a motor mounted on said base and connected to the main sheave to drive the same normally in one direction, said drive means including means adjustable to vary the maximum drive torque which may be applied to the main sheave in said direction, means permitting the sheave to be stopped and to be reversely rotated by an opposing load torque acting thereon exceeding said drive torque, and means operable to reverse the direction of drive torque applied to the main sheave, said main sheave standing free on said one side of the base to permit hanging a line bight over the sheave to run in its groove, and to permit removing the bight therefrom, by direct lateral approach and withdrawal of the bight in relation to the peripheral portion of the sheave adjacent the hanger means, the groove of said sheave having a relatively wide and shallow entrance portion adapted to accommodate knots in the line, and a relatively deep and narrow base portion with sides converging inwardly at a small acute angle to permit wedging of the running bight tightly down into the groove while excluding line knots therefrom, for increasing the sheave's friction force attainable on the line, and a line separator element mounted on said base adjacent a peripheral location on the sheave generally opposite that adjacent the hanger means, said separator element being operable to deflect the free end of the running bight out of the groove as the sheave rotates.

7. The combination defined in claim 6, wherein the line separator element comprises a tapered member projecting into the base portion of the groove and having tips directed oppositely from each other circumferentially in the groove, each acting to separate the line from the groove with the sheave in one direction or the other respectively.

8. The combination defined in claim 7, and a fair lead idler sheave mounted free standing on the same side of the base to rotate on an axis parallel to the axis of the main sheave, such that the load end of the bight leading to the main sheave is deflected by engagement with the idler sheave at a location offset from a plane substantially containing the hanger means and the axis of the main sheave, thereby to facilitate self-addressment of the block to the line.

9. The combination defined in claim 8, wherein the groove has a relatively wide and shallow entrance portion adapted to accommodate knots in the line and wherein the base portion is relatively narrow to exclude such knots therefrom.

10. The combination defined in claim 9, wherein the separator element has a shoulder on the circumferentially directed side thereof facing the oncoming line emerging from the groove with the sheave in its normal direction of rotation, which shoulder is inclined to the base side for deflecting the line outwardly from the block as the line leaves the sheave.

11. In combination with a crab fishing boat and the like having thereon a working surface adjacent the side to receive crab pots and the like for emptying, an elevated support located above said side and slightly outboard therefrom, a powered warping block for hauling in the lead line connected to the crab pot, said block comprising a base having hanger means thereon suspending the block from said support closely thereto for permitting free swinging and swivelling of the block relative to the support, and a motor-driven sheave mounted rotationally on one side of said base, with its general plane of rotation substantially aligned with the hanger means and with its rotational axis offset from said hanger means, said main sheave standing free on said one side of the base to permit hanging a line bight over the sheave to run in its groove, and to permit removing the bight therefrom, by direct lateral approach and withdrawal of the bight in relation to the peripheral portion of the sheave adjacent the hanger means, the groove of said sheave having a deep base portion with sides converging inwardly at a small acute angle to permit wedging of the running bight tightly down into the groove for increasing the sheave's friction force attainable thereon, and a line separator element mounted on said base adjacent a peripheral location on the sheave generally opposite that adjacent the hanger means, said separator element being operable to deflect the free end of the running bight out of the groove as the sheave rotates, and means connected to said support for raising and lowering the same and thereby said block between a normal position enabling an individual stationed at said side to apply and remove the line bight to and from the drive sheave, and an elevated position facilitating swinging of the surfacing crab pot inboard over the side and onto said surface.

12. The combination defined in claim 11, and drive means for the main sheave, including a motor mounted on said base and connected to the sheave to drive the same normally in one direction, said drive means including means adjustable to vary the maximum drive torque which may be applied to the main sheave in said direction, means permitting the sheave to be stopped and to be reversely rotated by an opposing load torque acting thereon exceeding said drive torque, and means operable to reverse the direction of drive torque applied to the main sheave.

13. The combination defined in claim 12, wherein the drive means motor comprises a hydraulic motor and the drive means further comprises a hydraulic pump with lines connected to the motor through controls stationed at the side of the boat, said controls including the means to vary maximum drive torque and the means to reverse the drive torque.

14. The combination defined in claim 11, and drive means for the main sheave, including a motor mounted on said base and connected to the sheave to drive the same normally in one direction, said drive means including means adjustable to vary the maximum drive torque which may be applied to the main sheave in said direction, means permitting the sheave to be stopped and to be reversely rotated by an opposing load torque acting thereon exceeding said drive torque.

References Cited in the file of this patent

UNITED STATES PATENTS

| | | |
|---|---|---|
| 2,733,530 | Puretic | Feb. 7, 1956 |
| 2,733,531 | Puretic | Feb. 7, 1956 |